(No Model.)
S. J. HOGGSON.
METHOD OF MAKING PIANO OR ORGAN KEYBOARDS.
No. 493,027.  Patented Mar. 7, 1893.
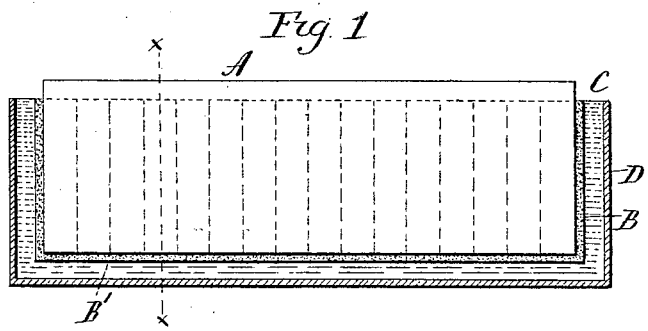
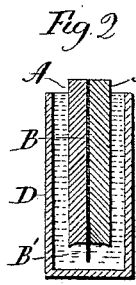 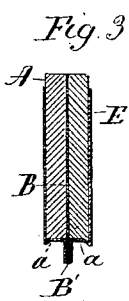 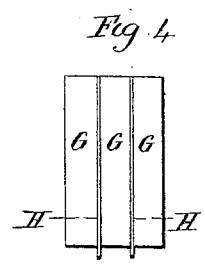 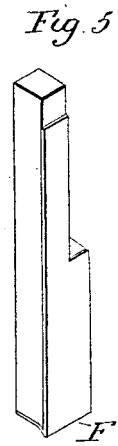

UNITED STATES PATENT OFFICE.

SAMUEL J. HOGGSON, OF NEW HAVEN, CONNECTICUT.

METHOD OF MAKING PIANO OR ORGAN KEYBOARDS.

SPECIFICATION forming part of Letters Patent No. 493,027, dated March 7, 1893.

Application filed December 5, 1892. Serial No. 454,058. (No model.)

*To all whom it may concern:*

Be it known that I, SAMUEL J. HOGGSON, of New Haven, in the county of New Haven and State of Connecticut, have invented a new Improvement in the Method of Making Piano and Organ Keyboards; and I do hereby declare the following, when taken in connection with accompanying drawings and the letters of reference marked thereon, to be a full, clear, and exact description of the same, and which said drawings constitute part of this specification, and represent, in—

Figure 1, an application of a coating to two key-boards, by immersing the same in a bath of covering composition. Fig. 2, a view in transverse section on the line $x-x$ of Fig. 1. Fig. 3, a view in transverse section of two key-boards secured together back to back, after they have had a covering applied to them in accordance with my invention. Fig. 4, a view showing a key-board cut up into key-blanks which are individually separated by bibulous strips, preparatory to being attached to another similarly prepared board, for treatment in accordance with my invention. Fig. 5, a detached perspective view on an enlarged scale, of a key taken out of a key-board produced under my invention.

Heretofore the key-boards of pianos and organs have generally been covered by a sheet of celluloid, cemented to them under pressure, and then when dry, polished and sawed up into the several keys, which together form the finished key-board. That process is objectionable, because the shrinkage of the celluloid causes the board to warp, making it difficult to polish and saw up, and the finished key-board is not as true and perfect as though it had not been warped so during the process, and furthermore, the celluloid coverings of key-boards so constructed, are apt to become detached under the action of the atmosphere, and heat and cold.

The object of my invention is to avoid the objections above referred to, and to simplify and cheapen the making of key-boards, and to secure an article not affected by atmospheric changes.

With these ends in view, my invention consists in a method of making key-boards for pianos, comprehending securing two key-boards together, back to back, then applying successive coats of a covering composition to them, and drying each coat separately, then separating and finishing them.

My invention further consists in certain details in the method as will be hereinafter described, and pointed out in the claims.

In carrying out my invention, I preferably secure two uncut or blank key-boards A A, back to back, in some manner which will permit them to be readily separated after their outer surfaces and edges have been covered or coated. I do not limit myself to securing the key-boards together in any particular way, but find that the purposes of my invention are well subserved if I attach them together by placing strips of bibulous paper B, saturated with a soluble adherent, such as mucilage, between them, in such a manner that they will project beyond the surfaces to be coated, as shown by Figs. 1 and 2 of the drawings. If preferred, some other material, such as cloth or spongy wood, may be substituted for bibulous paper, to the use of which I do not confine myself. After the boards have been secured together in some such manner as described, repeated coats of a covering composition are applied to them, by immersing them in a bath of the composition, or applying the same with a brush. As shown in Figs. 1 and 2 of the drawings, I employ a bath C, placed in a vat D. In prosecuting my invention, I might attach a number of pairs of key-boards secured together as described, to an endless belt, arranged to make the circuit of a room, and pass the boards through a bath at one point in its circuit, which would be long enough to cause the successive coats to dry thoroughly between each immersion of the boards in the vat. In some such way as incated, one attendant might look after the coating of a good many boards at one time. I do not limit myself to using any particular material, but suggest the use of a composition of crolithian, celluloid, zylonite, or other nitro-cellulose compound. Whatever material is used, it will probably be prepared in about the consistency of thick white paint. Then after a sufficient number of coatings have been applied to produce in the aggregate a layer E, (Fig. 3) about equal in thickness to to the thickness of the sheets of celluloid ordinarily used in covering piano key-boards, the boards are separated. That is done, as herein provided for, by breaking off the projecting edges B' of the strips B, as illustrated by Fig. 3 of the drawings which shows how the said edges will be coated with the other surfaces exposed to the bath, and increased in thickness. By breaking the said projecting edges off, raw edges are exposed, and to these water is applied, and being absorbed, breaks the bond uniting the two key-boards, which then come apart. Preferably I then subject the separated key-boards to heat and pressure, and thus solidify and form or mold their grouted coverings, and in particular, shape the same neatly at the outer ends of the keys, as shown at F in Fig. 5 of the drawings, which represents a key of a key-board formed in accordance with my improved method. The boards are then polished and finished in the ordinary manner. By this method the covers of the key-boards are grouted, so to speak, into the wood, without any intervening cement, and being entirely free from air bubbles, they are not liable to turn up or come off when the instruments to which they are applied are placed in a heated room, or long subjected to atmospheric changes.

When the covers are made independent of and cemented to the boards, they are arranged to overhang the upper edges of the same for a short distance. I secure the same effect by grooving the outer edges of the boards in such a manner that their upper edges overhang, as shown by a, in the drawings. Then when the coatings of composition are applied to the boards, the same will gravitate toward their outer edges, where the coating will be a little thicker, and thus heighten the effect produced by grooving the boards.

It will be obvious from the foregoing description, that my improved method of covering key-boards may be carried on at a reduced expense, inasmuch as at best two boards are handled at a time, instead of one board, as under the old process. Moreover, the boards are not warped during the process, and being perfectly flat when they are polished and cut up, are handled to advantage, and with a great saving of time. When done they are better able to resist atmospheric changes than key-boards prepared in the old way. Preferably, I shall coat the boards before they are cut up into key-form, but if desired, they may be cut up into key-blanks, as shown by Fig. 4 of the drawings, in which the key-blanks G G G are shown as separated by strips of bibulous paper H. Two key-boards thus cut up into key-blanks, are secured together, back to back, as before described, and treated in the same manner as they would be if not cut up, and then separated by the application of water, and finished. I would therefore have it understood that I do not limit myself to the exact steps and procedure herein detailed, but hold myself at liberty to make such variations therein as fairly full within the spirit and scope of my invention.

Having fully described my invention, what I claim as new, and desire to secure by Letters Patent, is—

1. A method of making key-boards, consisting in securing two key-boards together, back to back, then applying successive coats of a finishing composition to them, and drying each coat separately, then separating and finishing them, substantially as described.

2. A method of making key-boards, consisting in securing two boards together, back to back by bibulous material saturated with a soluble adherent, then applying successive coats of a finishing composition to them, and drying each coat separately, and then separating and finishing the boards, substantially as described.

In testimony whereof I have signed this specification in the presence of two subscribing witnesses.

SAMUEL J. HOGGSON.

Witnesses:
 FREDERIC C. EARLE,
 LILLIAN D. KELSEY.